United States Patent
Altamura

(10) Patent No.: US 11,432,388 B1
(45) Date of Patent: Aug. 30, 2022

(54) STABILIZING CURRENT OR VOLTAGE LIGHTING CIRCUIT WITH RESISTIVE BYPASS AND LED ILLUMINATION ASSEMBLIES

(71) Applicant: Seasonal Specialties, LLC, Eden Prairie, MN (US)

(72) Inventor: Steven J. Altamura, Scarsdale, NY (US)

(73) Assignee: Seasonal Specialties, LLC, Eden Prairie, MN (US)

( * ) Notice: Subject to any disclaimer, the term of this patent is extended or adjusted under 35 U.S.C. 154(b) by 0 days.

(21) Appl. No.: 17/394,892

(22) Filed: Aug. 5, 2021

Related U.S. Application Data

(60) Provisional application No. 63/191,537, filed on May 21, 2021.

(51) Int. Cl.
| | |
|---|---|
| H05B 45/20 | (2020.01) |
| H05B 45/48 | (2020.01) |
| H05B 45/54 | (2020.01) |
| H05B 45/42 | (2020.01) |

(52) U.S. Cl.
CPC ............ *H05B 45/54* (2020.01); *H05B 45/42* (2020.01); *H05B 45/48* (2020.01)

(58) Field of Classification Search
CPC ........ H05B 45/10; H05B 45/20; H05B 45/32; H05B 45/34; H05B 45/40; H05B 45/345; H05B 45/42; H05B 45/48; H05B 45/50; H05B 45/54
See application file for complete search history.

(56) References Cited

U.S. PATENT DOCUMENTS

| | | | | |
|---|---|---|---|---|
| 7,178,961 | B2 * | 2/2007 | Janning | H05B 39/105 |
| | | | | 362/565 |
| 9,433,057 | B1 * | 8/2016 | Janning | H05B 45/42 |
| 9,510,423 | B1 | 11/2016 | Janning | |
| 2004/0066148 | A1 * | 4/2004 | Oskorep | H05B 47/155 |
| | | | | 315/185 S |
| 2010/0320920 | A1 * | 12/2010 | Cheng | F21S 8/00 |
| | | | | 315/185 R |
| 2011/0210677 | A1 * | 9/2011 | Hering | H01R 13/6641 |
| | | | | 315/185 R |
| 2015/0015149 | A1 * | 1/2015 | Zhang | H05B 45/40 |
| | | | | 315/192 |

* cited by examiner

*Primary Examiner* — Thai Pham
(74) *Attorney, Agent, or Firm* — Hamre, Schumann, Mueller & Larson, P.C.

(57) ABSTRACT

A decorative light string is provided that includes a plurality of light emitting diode (LED) illumination assemblies electrically connected in series and a stabilizing current or voltage circuit. Each of the plurality of LED illumination assemblies includes an LED. The stabilizing current or voltage circuit is electrically connected in series with the plurality of LED illumination assemblies. The stabilizing current or voltage circuit is configured to receive input power from an input power source and configured to supply a stabilized current or voltage to the plurality of LED illumination assemblies that provides a stable supply even with input power source fluctuations. Power fluctuations from an input power source can prevent the decorative light string from maintaining a desired brightness and desired LED life unless the voltage or current to the LED illumination assemblies is stabilized.

18 Claims, 7 Drawing Sheets

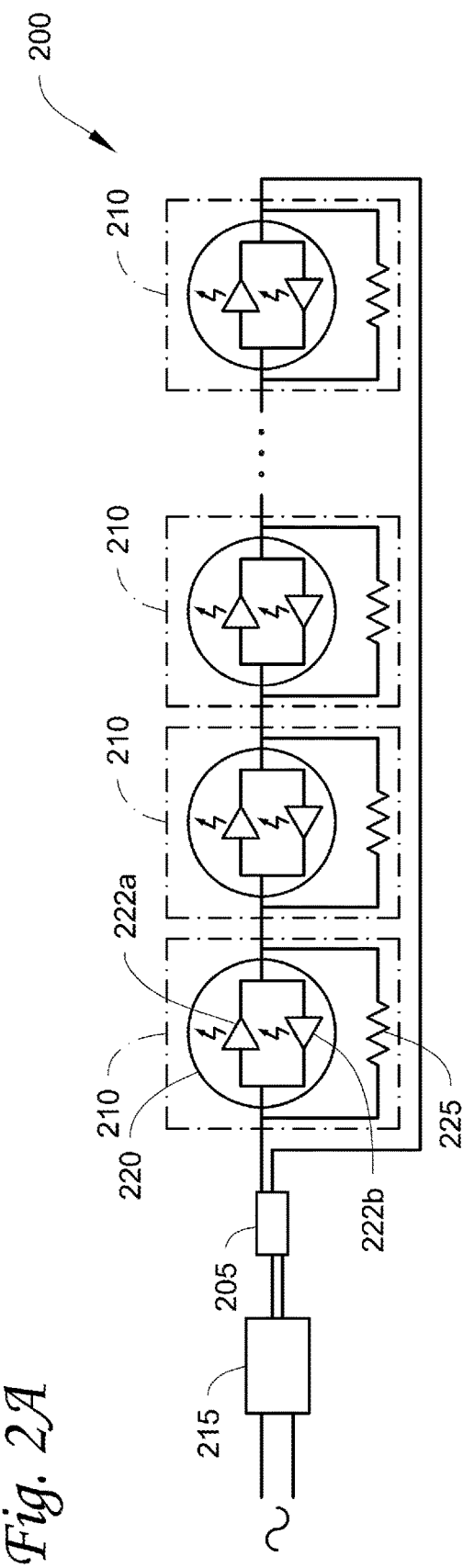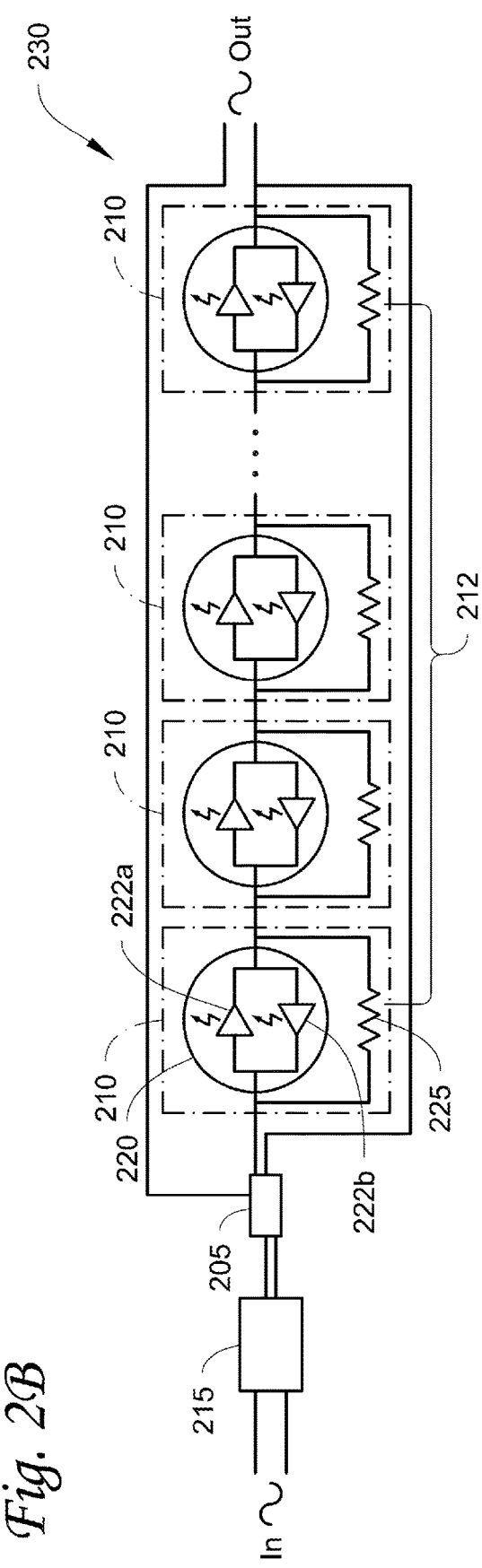

STABILIZING CURRENT OR VOLTAGE LIGHTING CIRCUIT WITH RESISTIVE BYPASS AND LED ILLUMINATION ASSEMBLIES

FIELD OF INVENTION

This disclosure relates to light-emitting diode (LED) lighting strings having a plurality of LED illumination assemblies spaced along the string.

BACKGROUND

Ornamental or decorative lighting, such as holiday lighting includes strings of bulbs spaced out along a pair of wires. The bulbs may be incandescent or now more frequently, LEDs. In the United States of America (USA) it is not uncommon for a power outlet rated at a nominal 120 volts (V) alternating current (AC) to supply voltage anywhere between 107V to 130V depending, on for example, a distance of the outlet from a utility transformer. Also, during a brownout (e.g., an intentional or unintentional drop in voltage in an electrical power supply system) the outlet may supply as low as 102V. Fluctuations in voltage supplied by the power outlet can thereby cause variations in brightness levels of conventional decorative lighting circuits.

As described in U.S. Pat. Nos. 9,433,057 and 9,510,423 ornamental or decorative light strings can provide a resistor in series with LEDs to limit the current to each of the LEDs. In these configurations, the amount of current to the LEDs can vary based on voltage variations from a power supply source (e.g., a 120 V AC power outlet). Such configurations can prevent the LEDs from maintaining a constant brightness and can potentially lead to LED burnout if an overvoltage situation occurs such as operation at 130V.

Light strings have employed bypass resistors to compensate for failed light elements/filaments, but the result is that the entire light string is dimmed by the increase string resistance. Thus the solution to protecting the string against being open circuited is incomplete without a way to maintain brightness.

BRIEF SUMMARY

The disclosure encompasses many embodiments. Potential embodiments are detailed below in summary fashion. Please understand that this summary does not encompass the entire disclosure but is provided to assist the reader in reviewing the entire disclosure and claims which also constitute part of the disclosure.

The embodiments disclosed herein provide an LED lighting string with an optional bypass element and single or dual-LED illumination assemblies using a stabilizing current or voltage circuit in-line with each LED illumination assembly.

The embodiments described herein can maintain current and/or voltage parameters of the LED illumination assemblies regardless of any input voltage fluctuation. For example, in some embodiments a brightness level of the LED illumination assemblies can be maintained regardless of any input voltage fluctuation. Also, the embodiments described herein can avoid quicker burnout of LED(s) for each of the LED illumination assemblies by preventing the LED(s) from receiving rising current caused by an overvoltage of the input voltage.

Conventional LEDs are not current limiting devices on their own and large current increases or decreases can be observed with small voltage changes. An example based on typical forward current versus forward voltage characteristics, for example of a white LED, demonstrates that with only a 17% increase in voltage, the current can exponentially increase by 500% and vice versa if the voltage were to decrease.

In one embodiment, a decorative light string is provided. The decorative light string includes a plurality of LED illumination assemblies and a stabilizing current or voltage circuit. The plurality of LED illumination assemblies is electrically connected in series and each of the LED illumination assemblies includes an LED. The stabilizing current or voltage circuit is electrically connected in series with the plurality of LED illumination assemblies. The stabilizing current or voltage circuit is configured to receive input power from an input power source and configured to supply a stabilized current or voltage to the plurality of LED illumination assemblies that provides a stable supply even with input power source fluctuations.

In some embodiments, each of the plurality of LED illumination assemblies includes a bypass element electrically connected in parallel with the LED.

In some embodiments, the bypass element can be a resistor, a Zener diode, a thermistor, a capacitor, etc.

In some embodiments, the decorative light string includes a controller configured to control current flow provided to the stabilizing current or voltage circuit to switch between a steady on state to one or more special effects states.

In some embodiments, the one or more special effects states includes at least one of twinkling, flashing/fading/pulsating and color changing.

In some embodiments, the controller includes a rectifier to convert the input power from the input power source from an alternating current (AC) input power to a direct current (DC) power.

In some embodiments, each of the plurality of LED illumination assemblies is a dual-LED illumination assembly including the LED and at least a second LED electrically connected in parallel.

In some embodiments, the LED and at least the second LED are configured to conduct current in opposing directions to form a bi-directional LED.

In some embodiments, the LED and at least the second LED are configured to conduct current in a same direction to form a parallel LED.

In some embodiments, each of the plurality of LED illumination assemblies includes a bypass element electrically connected in parallel with the LED and at least the second LED.

In some embodiments, the decorative light string also includes a plurality of second LED illumination assemblies that are electrically connected in series. Each of the plurality of second LED illumination assemblies includes a second LED. The plurality of second LED illumination assemblies are connected in series with the stabilizing current or voltage circuit and are connected in parallel with the plurality of LED illumination assemblies. The stabilizing current or voltage circuit is configured to supply a stabilized current or voltage to the plurality of second LED illumination assemblies that provides a stable supply even with input power source fluctuations.

In some embodiments, the stabilizing current or voltage circuit is a constant current circuit configured to supply a stabilized current to the plurality of LED illumination assemblies even with input power source fluctuations.

In some embodiments, the stabilizing current circuit includes a current control circuit, a resistive element electrically connected to the current control circuit, and a distribution circuit electrically connected to the current control circuit. The distribution circuit is configured to receive AC input power from the input power source and configured to supply a stabilized DC current to the plurality of LED illumination assemblies that provides a stable supply even with input power source fluctuations. The current control circuit with the resistive element is configured to control a current value of the stabilized DC current supplied by the distribution circuit.

In some embodiments, the stabilizing current or voltage circuit is a constant voltage circuit configured to supply a stabilized voltage to the plurality of LED illumination assemblies that provides a stable supply even with input power source fluctuations.

In some embodiments, each of the plurality of LED illumination assemblies includes the LED and one or more additional LEDs.

In some embodiments, the LED and at least one of the one or more additional LEDs are configured to conduct current in opposing directions.

In some embodiments, the LED and at least one of the one or more additional LEDs are each housed in a separate enclosure.

In some embodiments, the LED and at least one of the one or more additional LEDs are configured to conduct current in a same direction.

In another embodiment, a method for preventing dimming of a light string constructed of plurality of LEDs, which are protected against open circuiting due to LED failure, is provided. The method includes configuring the decorative light string to receive input power from an input power source. The method also includes connecting a bypass element in parallel with at least some of the plurality of LEDs, so that in the event an LED fails, the light string will continue to conduct current. Also, the method includes configuring the input power source to supply a stabile current or voltage to the LEDs such that the stabile current or voltage is provided regardless of whether any of the plurality of LEDs fail.

In yet another embodiment, a method for preventing shortening a life of a decorative light string constructed of a plurality of LEDs, which are protected against open circuiting due to LED failure, is provided. The method includes configuring the decorative light string to receive input power from an input power source. The method also includes connecting a bypass element in parallel with at least some of the plurality of LEDs, so that in the event that any of the plurality of LEDs fail, the decorative light string will continue to conduct current. Also, the method includes configuring the input power source to supply a stabile current or voltage to the plurality of LEDs such that a stabile current or voltage is provided regardless of whether any of the plurality of LEDs fail.

BRIEF DESCRIPTION OF THE DRAWINGS

FIG. 2A is a circuit diagram of a stabilizing current or voltage dual-LED lighting circuit with resistive bypass according to a first embodiment.

FIG. 2B is a circuit diagram of a stabilizing current or voltage dual-LED lighting circuit with resistive bypass according to a second embodiment.

Like reference numbers represent like parts throughout.

DETAILED DESCRIPTION

The embodiments disclosed herein provide a current or voltage limiting lighting circuit with an optional bypass element and LED illumination assemblies.

In some embodiments, the current limiting lighting circuit can use a stabilizing current or voltage circuit in-line with each LED illumination assembly.

In this disclosure, embodiments of a current or voltage limiting lighting circuit with a plurality of LED illumination assemblies are provided. These embodiments are particularly advantageous for maintaining a brightness level and a life of the illumination assemblies even with voltage fluctuations from a power supply source (e.g., a 120 V AC power outlet). Also in some cases LEDs fail as a short circuit, in which case the embodiments described herein can limit the current or voltage from increasing across the remaining LEDs in series as the total current/voltage is limited.

When an LED has a bypass element (such as a resistor, diode, Zener diode, thermistor, capacitor or other active or passive device) connected in parallel, the bypass element provides a bypass route for current in the event the LED fails. If too many LEDs fail as a short circuit, the current through or voltage applied to the remaining LEDs may be so great as to cause further LED failures to cascade through the system. To prevent this, and still have the benefits of the bypass, controlling/stabilizing/limiting the amount of current through or voltage applied at input will prevent this cascade failure. Also, if too many LEDs fail as an open circuit, through or the voltage applied to the remaining LEDs may drop which can cause the brightness of the remaining LEDs to dim.

The other possibility is that the failure of an LED, causes the rest of the light string to dim because the optional bypass element has a higher resistance than the combination of the optional bypass element plus LED. As several LEDs fail, the string will go dim. To prevent this, the power supply is adapted to insure that a stabilized voltage (or a stabilized current, or both) is provided regardless of the line resistance in the string.

Figure 1A:
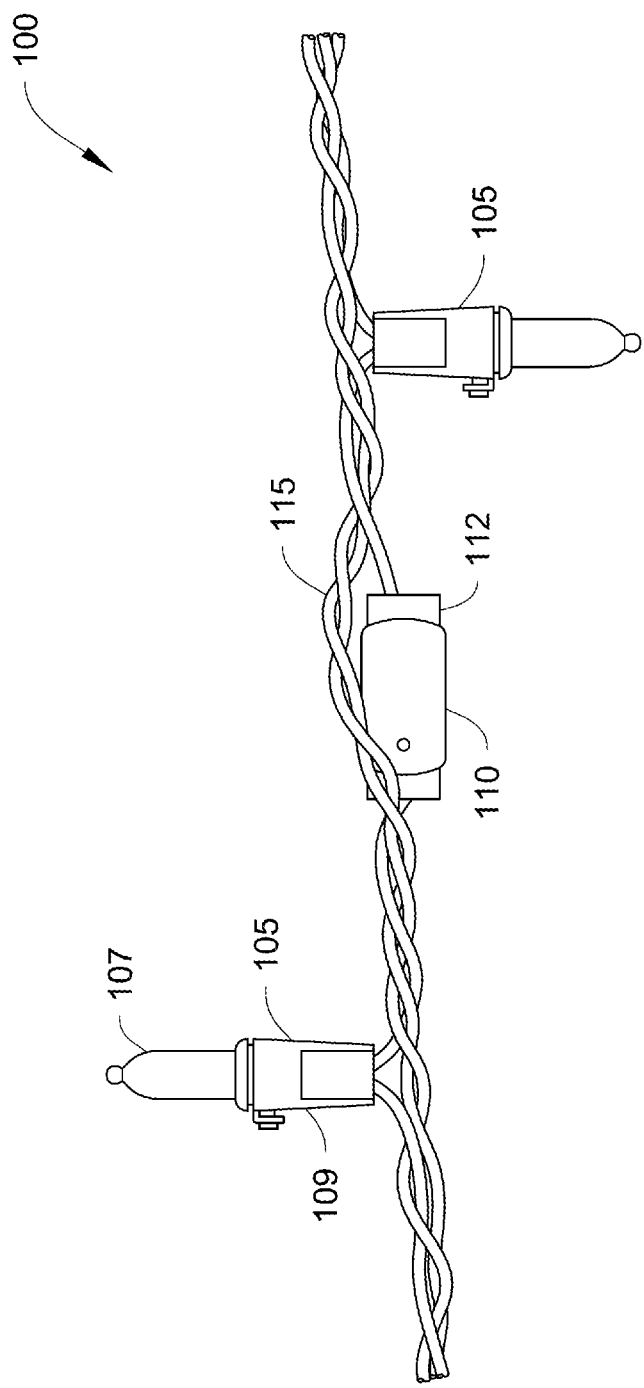
FIG. 1A illustrates a portion of an ornamental or decorative light string, according to one embodiment.
Figure 1B:
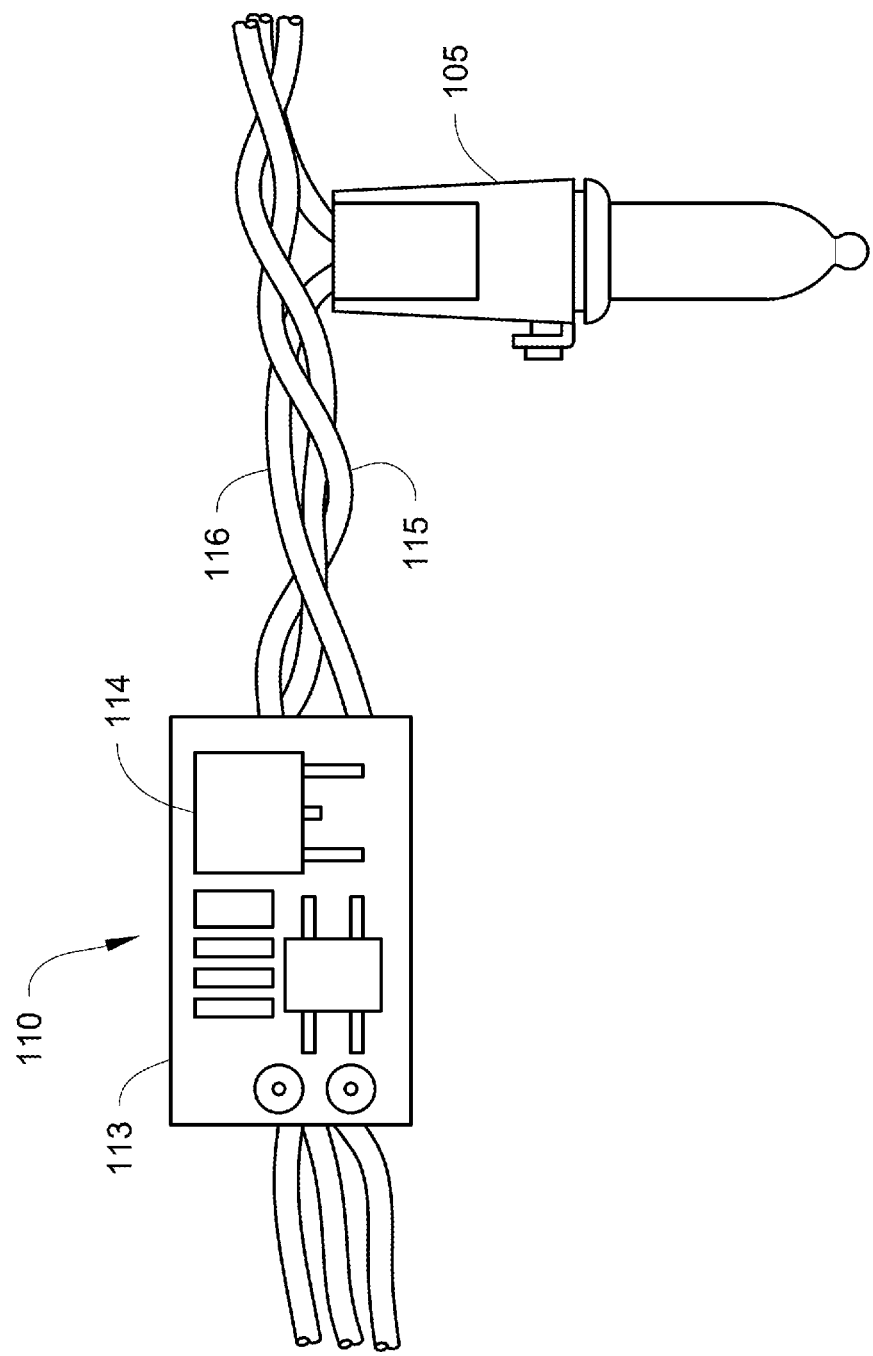
FIG. 1B illustrates a portion of the ornamental or decorative light string shown in FIG. 1A without a protective housing, according to one embodiment.

FIGS. 1A-B illustrate a portion of an ornamental or decorative light string 100 according to the embodiments described herein. The light string 100 includes a plurality of illumination assemblies 105 and a stabilizing current or voltage circuit 110 electrically and physically connected via a wire pair 115.

Each of the illumination assemblies 105 includes a bulb housing 107 configured to house, for example, one or more LEDs (not shown), and a socket 109 configured to electrically and physically connect the one or more LEDs to a wire (not shown) of the wire pair 115. In some embodiments, each of the illumination assemblies 105 can be a dual-LED illumination assembly. In some embodiments the dual-LED illumination assembly can include a bi-directional LED that includes at least two opposing LEDs configured to conduct current in opposing directions as discussed in more detail below with respect to FIGS. 2A-2D. In some embodiments the dual-LED illumination assembly can include at least two LEDs in parallel configured to conduct current in the same direction, as discussed in more detail below with respect to FIGS. 2E-2H. In some embodiments, each of the LEDs of a dual-LED illumination assembly can be independently controlled. While the illumination assemblies 105 includes a single bulb housing 107, it will be appreciated that in other embodiments an illumination assembly with multiple bulb housings each housing one or more of the LEDs. Also, in some embodiments, each of the LEDs of a dual-LED illumination assembly can emit a different color light. The plurality of illumination assemblies 105 can be configured to emit ornamental or decorative lighting. In some embodiments, each of the illumination assemblies can include a single LED chip.

The stabilizing current or voltage circuit 110 includes a protective housing 112 (see FIG. 1A) that houses a printed circuit board 113 (see FIG. 1B) that includes a stabilizing current or voltage circuit 114 (see FIG. 1B). The stabilizing current or voltage circuit 110 can be configured to receive power from an input power source (such as a 120 V AC power outlet) and can be configured to supply a stabilized current or voltage to one or more of the illumination assemblies 105. In some embodiments, the stabilizing current or voltage circuit 110 can be a constant current source, a constant voltage source, etc. In some embodiments, a voltage regulator, such as a linear regular using 76X/79 XX series chips, a switching regulator using an LM2676 chip would be suitable, an SCR regulator or other known circuits would be suitable. See https://en.wikipedia.org/wiki/Voltage_regulator for examples.

The illumination assemblies 105 are wired to the stabilizing current or voltage circuit 110 via the wire pair 115. The wire pair 115 includes a protective sheath 116 that covers the wire (not shown) housed therein.

In some embodiments, the light string 100 can also include a controller (not shown) that can control current flow provided to the stabilizing current or voltage circuit 110 to switch between a steady on state to one or more special effects states such as a twinkling, flashing/fading/pulsating, color changing, or other switchable effects which may include reversing the voltage to the LEDs.

Twinkling can be described as a change in brightness (ramping up/down, dimming) or a switching on/off and changing the frequency of the switching or both including the separate control of red, green and blue LEDs in a single illumination assembly 105 to create color changing effects that include fading or flashing.

Examples of light strings that can switch between a steady on to a twinkling effect are disclosed in U.S. Pat. Nos. 10,080,265 and 9,554,437 that are owned by Seasonal Specialties, LLC and incorporated herein by reference in their entirety.

Different embodiments of a circuit architecture for the light string 100 are discussed in more detail below with respect to FIGS. 2A-F.

FIGS. 2A-2H illustrate different embodiments of a circuit architecture for the light string 100 shown in FIGS. 1A-B. It will be appreciated that the circuits described below can be configured to be connected to and receive power from a conventional power outlet (e.g., a nominal 120 V AC power outlet). While the embodiments described with respect to FIGS. 2A-2H all include dual-LED illumination assemblies, it will be appreciated that in other embodiments a single LED illumination assembly can also be used.

FIG. 2A is a circuit diagram of a stabilizing current or voltage dual-LED lighting circuit 200 with resistive bypass according to a first embodiment. The circuit 200 is a series connected light string that includes a stabilizing current or voltage circuit 205, a plurality of bi-directional LED illumination assemblies 210 and a controller 215.

The plurality of bi-directional LED illumination assemblies 210 are configured in series. Each of the bi-directional LED illumination assemblies 210 includes a bi-directional LED 220 in parallel with an optional bypass element, shown here as resistor 225. The bi-directional LED 220 includes opposing LEDs 222a, 222b that are configured conduct current in opposing directions. In some embodiments the opposing LEDs 222a, 222b are two separate LED chips with one chip opposing the other chip. It will be appreciated that while the bi-directional LED 220 shown in FIGS. 2A-2D includes only two opposing LEDs 222a, 222b, in other embodiments a bi-directional LED can be used that includes 3 or more LEDs that are configured to conduct current in opposing directions. It will be appreciated that each of the two opposing LEDs 222a,b can be housed in a separate enclosure or both of the opposing LEDs 222a,b can be housed in the same enclosure.

In some embodiments, the optional bypass element can also be, for example, a diode, a Zener diode, a thermistor, a capacitor, etc. Also, it will be appreciated that in other embodiments, the plurality of bi-directional LED illumination assemblies 210 may not include the optional bypass element such as the resistor 225.

When all bi-directional LEDs 220 are operating properly, a portion of the total current flowing through one of the bi-directional LED illumination assemblies 210 flows through the bi-directional LED 220, while the remainder of the total current can flow through the optional bypass element (for example, when the optional bypass element is the resistor 225, a capacitor, etc.) It will be appreciated that when the optional bypass element is a thermistor, diode, Zener diode, etc., current does not flow through the optional bypass element until, for example, the corresponding bi-directional LED illumination assembly 210 fails. In the event that a bi-directional LED 220 ceases to conduct, and current flow is interrupted through that bi-directional LED 220, the total current will flow through its corresponding bypass element (e.g., the resistor 225). A missing, broken, or improperly connected bi-directional LED 220 may cause the bi-directional LED 220 to fail to conduct. Without bypass elements operating in parallel with a corresponding bi-directional LED 220, any failure in one bi-directional LED illumination assembly 210 would interrupt power to all other bi-directional LED illumination assemblies 210. The values of bypass elements are typically the same, and are chosen such that an appropriate current flows through the bi-directional LED 220 when all the bi-directional LEDs 220 are operating properly.

The stabilizing current or voltage circuit 205 is configured to maintain current and/or voltage parameters for power being supplied to the bi-directional LED illumination assemblies 210. Thus, regardless of any input voltage fluctuation that may occur from an input power source (or input line voltage) powering the circuit 200, the bi-directional LED illumination assemblies 210 are prevented from receiving power deviating from the designed operating parameters of the bi-directional LED illumination assemblies 210. For example, if the input power source (or input line voltage) goes higher than the designed operating parameters of the bi-directional LED illumination assemblies 210, the stabilizing current or voltage circuit 205 can maintain a desired current or voltage to the bi-directional LED illumination assemblies 210 and thereby prevent, for example, burnout of the bi-directional LEDs 220. Depending on operation (or inclusion) of the controller 215, the stabilizing current or voltage circuit 205 is capable of receiving an AC power signal, a chopped AC power signal, a direct current (DC) power signal, and a pulsed DC power signal. Details of the stabilizing current or voltage circuit 205 is discussed in more detail below with respect to FIG. 3. In some embodiments, the stabilizing current or voltage circuit 205 can be configured to prevent overheating of one or more bi-directional LED illumination assemblies 210.

The controller 215 is configured to control operation of the circuit 200. That is, the controller 215 can control current flow provided to the stabilizing current or voltage circuit 205 to switch between a steady on state to one or more special effects states such as a twinkling, flashing/fading/pulsating, color changing, or other switchable effects. In some embodiments, the controller 215 can supply an AC power signal to the stabilizing current or voltage circuit 205. In some embodiments, the controller 215 can supply a chopped AC power signal to the stabilizing current or voltage circuit 205. In some embodiments, the controller 215 can include a rectifier (e.g., a full wave rectifier, a half wave rectifier, etc.) (not shown). In some embodiments, when the controller 215 includes a rectifier, the controller 215 can supply a DC power signal to the stabilizing current or voltage circuit 205. In some embodiments, when the controller 215 includes a rectifier, the controller 215 can supply a pulsed DC power signal to the stabilizing current or voltage circuit 205. Also, in some embodiments, the controller 215 can control which of the opposing LEDs 222a, 222b are turned on or off at any given time.

FIG. 2B is a circuit diagram of a stabilizing current or voltage dual-LED lighting circuit 230 with resistive bypass according to a second embodiment. This embodiment is similar to the embodiment shown in FIG. 2A except that the circuit 230 is a series-parallel connected light string rather than a series connected light string. In a series-parallel configuration one or more groupings 212 of bi-directional LED illumination assemblies 210 can be connected in parallel, with each of the one or more groupings 212 including multiple bi-directional LED illumination assemblies 210 connected in series.

Figure 2C:
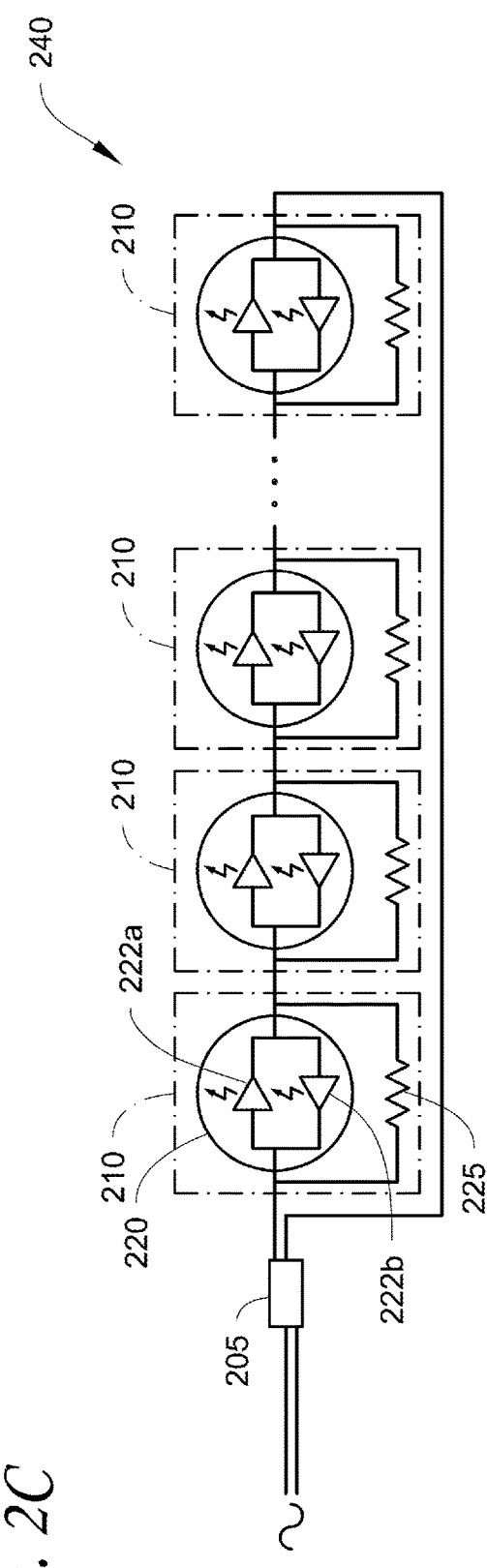
FIG. 2C is a circuit diagram of a stabilizing current or voltage dual-LED lighting circuit with resistive bypass according to a third embodiment.

FIG. 2C is a circuit diagram of a stabilizing current or voltage dual-LED lighting circuit 240 with resistive bypass according to a third embodiment. Similar to FIG. 2A, the circuit 240 is a series connected light string that includes a stabilizing current or voltage circuit 205 and a plurality of bi-directional LED illumination assemblies 210. However, the circuit 240 does not include a controller (such as the controller 215 shown in FIGS. 2A and 2B). Accordingly, the circuit 240 is configured to always operate in a steady on state and does not have the capability of providing one or more special effects states such as a twinkling, flashing/fading/pulsating, color changing, or other switchable effects.

Figure 2D:
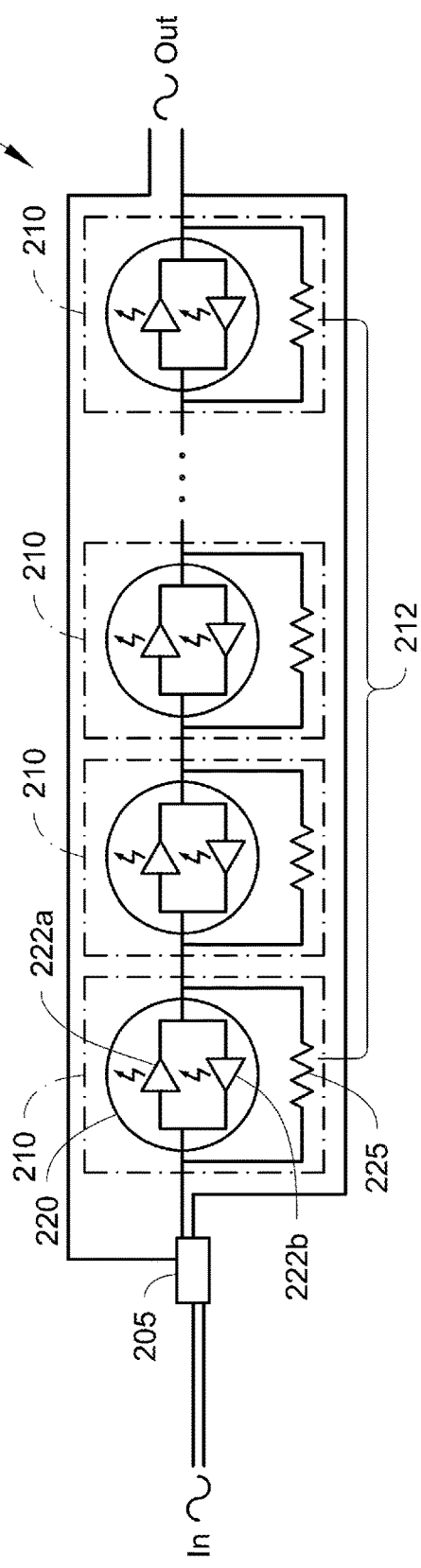
FIG. 2D is a circuit diagram of a stabilizing current or voltage dual-LED lighting circuit with resistive bypass according to a fourth embodiment.

FIG. 2D is a circuit diagram of a stabilizing current or voltage dual-LED lighting circuit 250 with resistive bypass according to a fourth embodiment. Similar to FIG. 2B, the circuit 250 is a series-parallel connected light string that includes a stabilizing current or voltage circuit 205 and a plurality of bi-directional LED illumination assemblies 210 combined in one or more groupings 212. However, the circuit 250 does not include a controller (such as the controller 215 shown in FIGS. 2A and 2B).

Figure 2E:
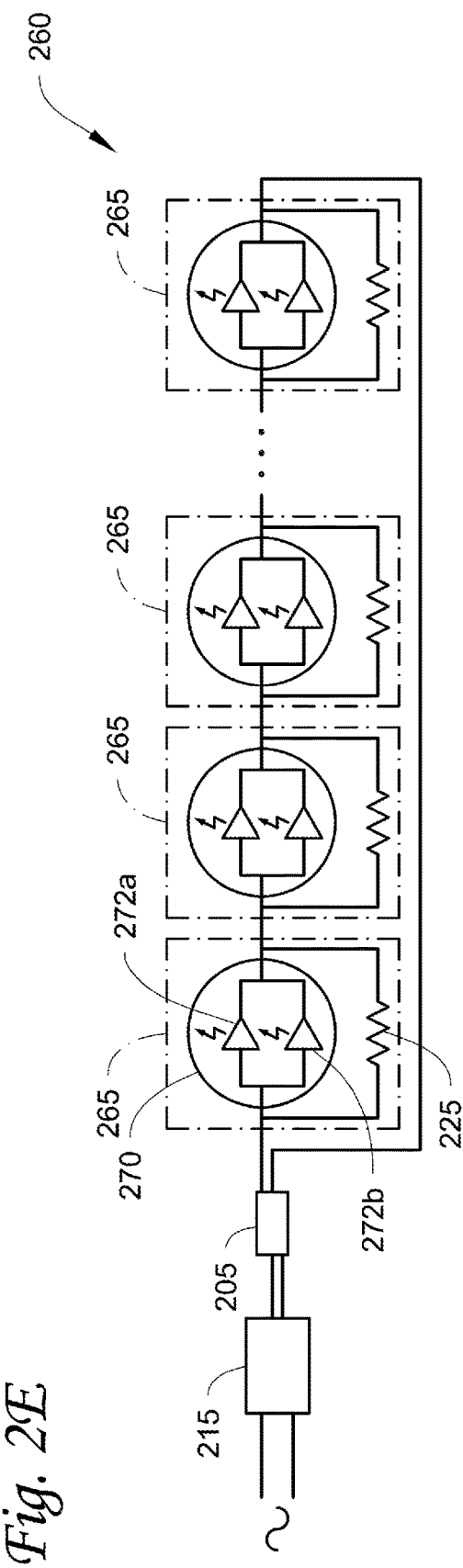
FIG. 2E is a circuit diagram of a stabilizing current or voltage dual-LED lighting circuit with resistive bypass according to a fifth embodiment.

FIG. 2E is a circuit diagram of a stabilizing current or voltage dual-LED lighting circuit 260 with resistive bypass according to a fifth embodiment. This embodiment is similar to the embodiment shown in FIG. 2A except that the circuit 260 includes a plurality of parallel LED illumination assemblies 265 as opposed to the plurality of bi-directional LED illumination assemblies 210 shown in FIGS. 2A-D.

Figure 2F:
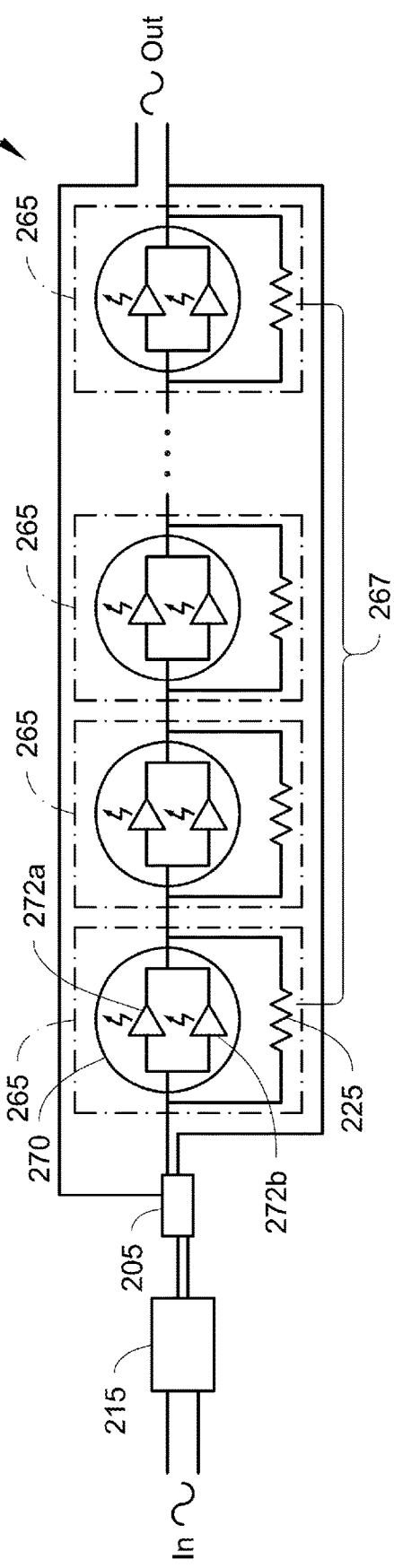
FIG. 2F is a circuit diagram of a stabilizing current or voltage dual-LED lighting circuit with resistive bypass according to a sixth embodiment.

FIG. 2F is a circuit diagram of a stabilizing current or voltage dual-LED lighting circuit 275 with resistive bypass according to a sixth embodiment. This embodiment is similar to the embodiment shown in FIG. 2B except that the circuit 275 includes the plurality of parallel LED illumination assemblies 265 as opposed to the plurality of bi-directional LED illumination assemblies 210 shown in FIGS. 2A-D. The circuit 275 is a series-parallel connected light string that includes the stabilizing current or voltage circuit 205 and the plurality of parallel LED illumination assemblies 265 combined in one or more groupings 267.

Figure 2G:
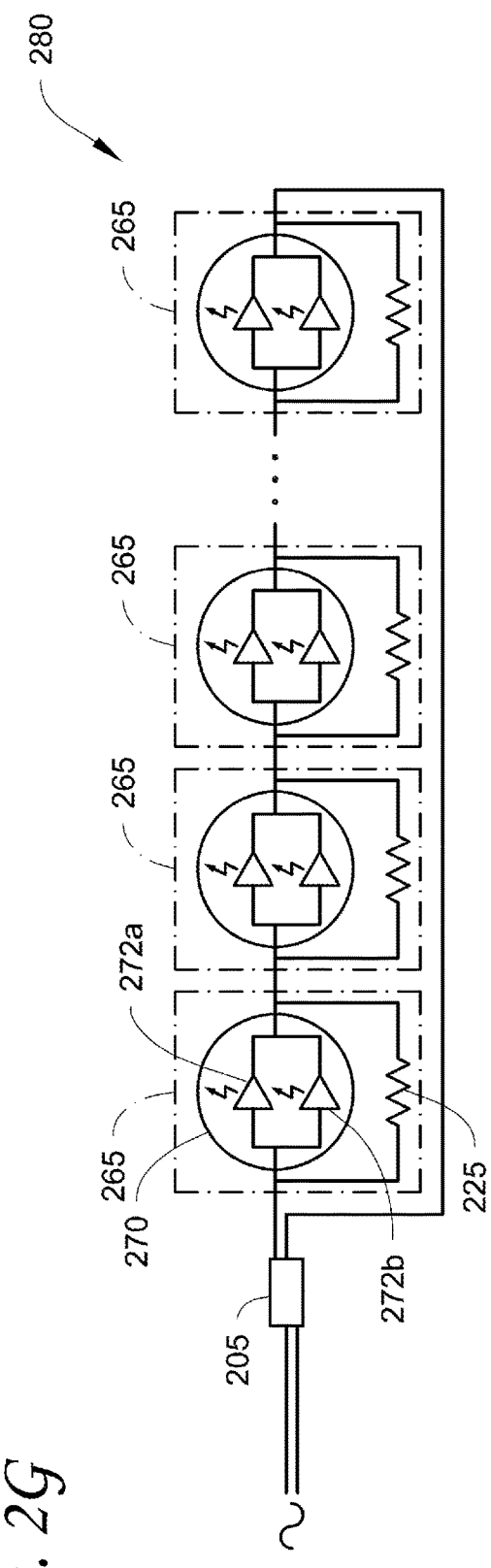
FIG. 2G is a circuit diagram of a stabilizing current or voltage dual-LED lighting circuit with resistive bypass according to a seventh embodiment.

FIG. 2G is a circuit diagram of a constant current or voltage dual-LED lighting circuit 280 with resistive bypass according to a seventh embodiment. This embodiment is similar to the embodiment shown in FIG. 2C except that the circuit 280 includes the plurality of parallel LED illumination assemblies 265 as opposed to the plurality of bi-directional LED illumination assemblies 210 shown in FIGS. 2A-D.

Figure 2H:
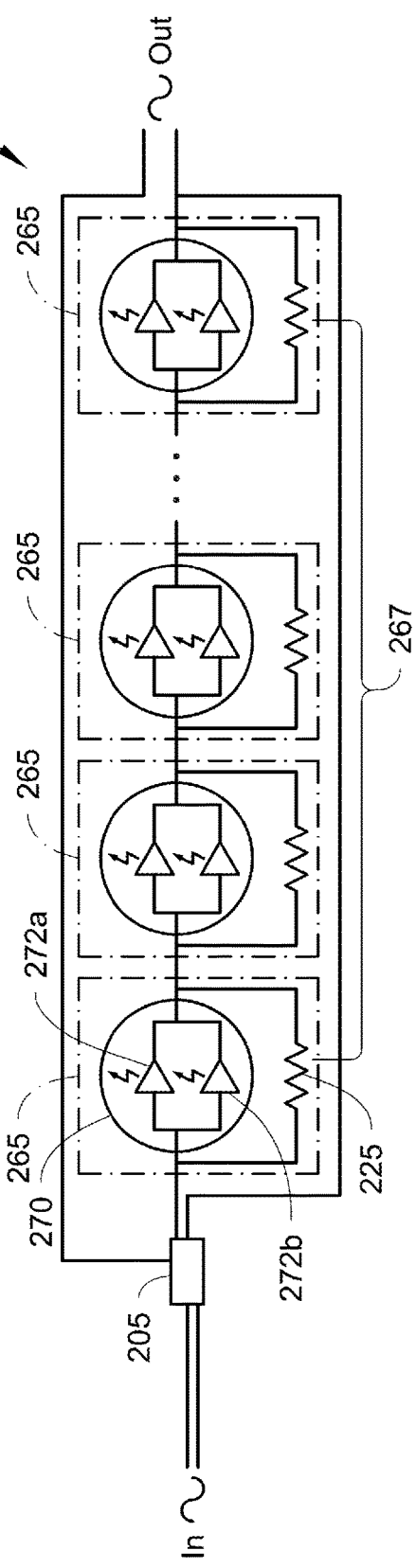
FIG. 2H is a circuit diagram of a stabilizing current or voltage dual-LED lighting circuit with resistive bypass according to an eighth embodiment.

FIG. 2H is a circuit diagram of a stabilizing current or voltage dual-LED lighting circuit 290 with resistive bypass according to an eighth embodiment. This embodiment is similar to the embodiment shown in FIG. 2C except that the circuit 290 includes the plurality of parallel LED illumination assemblies 265 as opposed to the plurality of bi-directional LED illumination assemblies 210 shown in FIGS. 2A-D. The circuit 290 is a series-parallel connected light string that includes the stabilizing current or voltage circuit 205 and the plurality of parallel LED illumination assemblies 265 combined in one or more groupings 267.

With respect to FIGS. 2E-2H, each of the parallel LED illumination assemblies 265 includes a parallel LED 270. In some embodiments, the parallel LED 270 includes a pair of LEDs 272a,b in parallel with the optional bypass element shown here as the resistor 225. It will be appreciated that while the parallel LED 220 shown in FIGS. 2E-2H includes only two LEDs 272a,b in parallel, in other embodiments a parallel LED can be used that includes 3 or more LEDs that are configured to conduct current in in the same directions. In some embodiments, the optional bypass element can also be, for example, a diode, a Zener diode, a thermistor, a capacitor, etc. Each of the pair of LEDs 272a,b are configured to conduct current in the same direction. In some embodiments the LEDs 272a, 272b are at least two separate LED chips with one chip in-line and in parallel with the other chip. It will be appreciated that each of the two LEDs 272*a,b* can be housed in a separate enclosure or both of the two LEDs 272*a,b* can be housed in the same enclosure. It will be appreciated that in some embodiments, the parallel LED illumination assemblies 265 may not include the optional bypass element such as the resistor 225.

When all parallel LEDs 270 are operating properly, a portion of the total current flowing through one of the parallel LED illumination assemblies 265 flows through both the parallel LEDs 272*a,b*, while the remainder of the total current can flow through the optional bypass element (for example, when the optional bypass element is the resistor 225, a capacitor, etc.). It will be appreciated that when the optional bypass element is a thermistor, diode, Zener diode, etc., current does not flow through the optional bypass element until, for example, the corresponding parallel LED illumination assembly 265 fails. In the event that one of the parallel LEDs 272*a,b* ceases to conduct, and current flow is interrupted through that parallel LED 272*a* or 272*b*, a portion of the current will flow through the other of parallel LED 272*b* or 272*a* and the remaining portion of the total current will flow through its corresponding bypass element (e.g., when the optional bypass element is the resistor 225). In the event that both parallel LEDs 272*a* and 272*b* cease to conduct, and current flow is interrupted through both parallel LEDs 272*a* and 272*b*, the total current will flow through its corresponding bypass element. A missing, broken, or improperly connected parallel LED 270 may cause the parallel LEDs 270 to fail to conduct. Without bypass elements operating in parallel with corresponding parallel LEDs 270, any failure in one parallel LED illumination assembly 265 would interrupt power to all other parallel LED illumination assemblies 265. The values of bypass elements are typically the same, and are chosen such that an appropriate current flows through the parallel LEDs 270 when all the parallel LEDs 270 are operating properly.

Figure 3:
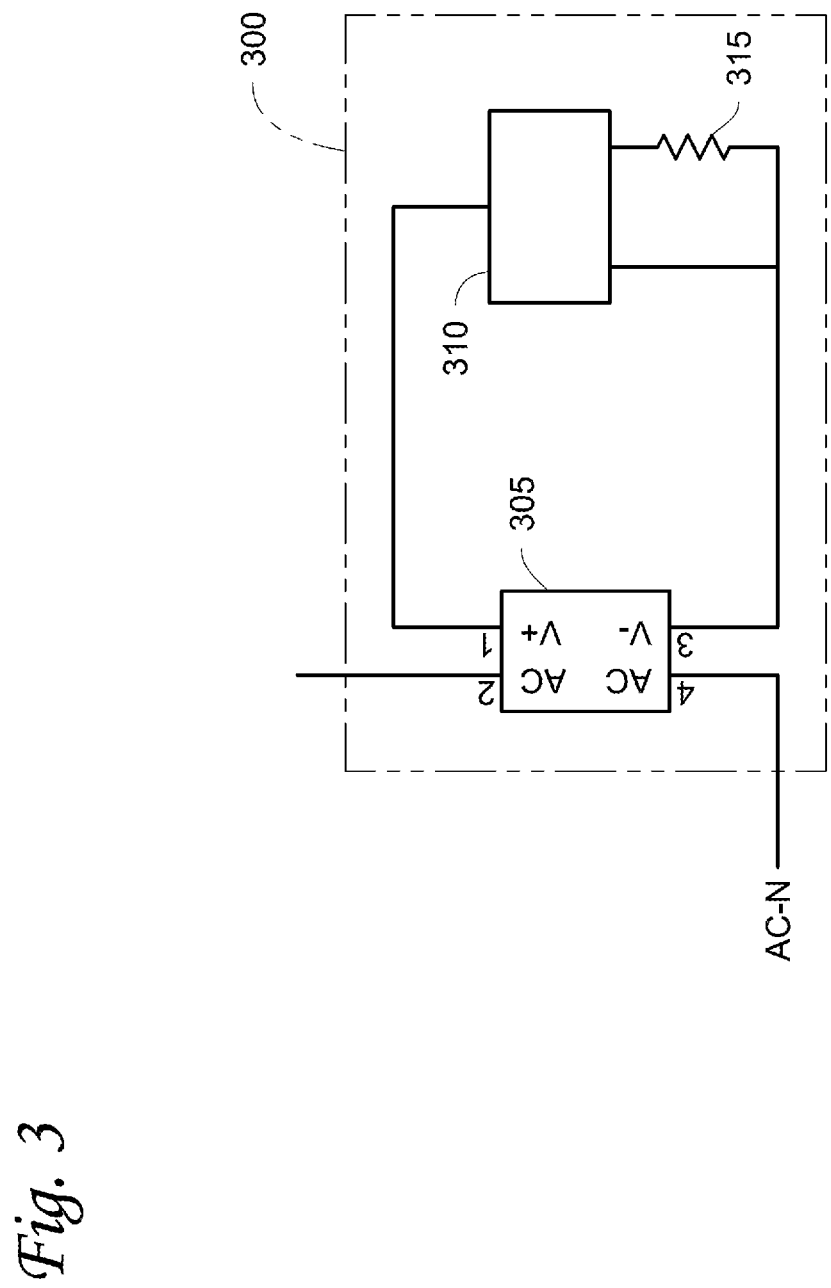
FIG. 3 is a circuit diagram view of a constant current circuit, according to one embodiment.

FIG. 3 is a circuit diagram view of a constant current circuit 300, according to one embodiment. In some embodiments, the stabilizing current or voltage circuit 205 shown in FIGS. 2A-H can be the constant current circuit 300 discussed below.

The constant current circuit 300 is configured to provide a stabilized amount of current to a load (e.g., one or more dual-LED illumination assemblies such as the bi-directional LED illumination assemblies 210 and the parallel LED illumination assemblies 265, etc.) that provides a stable supply even with input power source fluctuations from an input power source (such as a 120 V AC power outlet). The constant current circuit 300 can also prevent the load from an overvoltage situation. In some embodiments, when then current flowing through the constant current circuit 300 is greater than a maximum current threshold, the constant current circuit 300 can use a feedback control loop to reduce the current outputted by the constant current circuit 300. Similarly, in some embodiments, when then current flowing through the constant current circuit 300 is less than a minimum current threshold, the constant current circuit 300 can use a feedback control loop to increase the current outputted by the constant current circuit 300. In some embodiments, the constant current circuit 300 includes overheat regulation functionality. When the constant current circuit 300 is overheated, the output current from the constant current circuit 300 can be gradually reduced to control the temperature increase of a drive board of the constant current circuit 300. This can increase the reliability and service life of the decorative or ornamental light string.

The constant current circuit 300 includes a distribution circuit 305 electrically connected to a current control circuit 310. The current control circuit 310 is electrically connected to a resistive element 315 shown here as a resistor. In some embodiments, the resistive element 315 can be something other than a passive resistor, for example, a diode, a Zener diode, a thermistor, a capacitor, etc. In some embodiments, the constant current circuit 300 can be configured to prevent overheating of one or more dual-LED illumination assemblies.

The distribution circuit 305 is configured to receive an AC power signal from, for example, an input power source (such as a 120 V AC power outlet) and output a stabilized DC current signal to the load. The current control circuit 310 is configured to control the current of the stabilized DC current signal outputted by the distribution circuit 305. The value of the stabilized DC current is controlled by the resistance value of the resistive element 315.

In some embodiments, the distribution circuit 305 can prevent overheating of the one or more dual-LED illumination assemblies in an entire decorative or ornamental lighting string by preventing current to the dual-LED illumination assemblies from exceeding their maximum current rating.

The description of the embodiments disclosed herein and its applications as set forth herein are illustrative and are not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A decorative light string comprising:
a plurality of light emitting diode (LED) illumination assemblies electrically connected in series, wherein each of the plurality of LED illumination assemblies includes a first LED and one or more additional LEDs electrically connected in parallel with the first LED, wherein each of the plurality of LED illumination assemblies includes a bypass element electrically connected in parallel with the first LED and the one or more additional LEDs;
a stabilizing current or voltage circuit electrically connected in series with the plurality of LED illumination assemblies, wherein the stabilizing current or voltage circuit is configured to supply a stabilized current or voltage to the plurality of LED illumination assemblies that provides a stable supply even with input power source fluctuations, and
wherein the stabilizing current or voltage circuit includes:
a distribution circuit configured to output a stabilized DC current signal,
a current control circuit electrically connected to the distribution circuit, wherein the current control circuit is configured to control a current of the stabilized DC current signal outputted by the distribution circuit, and
a resistive element electrically connected to the current control circuit, wherein the stabilized DC current is controlled by a resistance value of the resistive element; and
a controller electrically disposed between the input power source and the stabilizing current or voltage circuit, and wherein the controller is configured to control current flow provided to the stabilizing current or voltage circuit to switch between a steady on state to one or more special effects states.

2. The decorative light string of claim 1, wherein the bypass element is a resistor.

3. The decorative light string of claim 1, wherein the one or more special effects states includes at least one of twinkling, flashing/fading/pulsating and color changing.

4. The decorative light string of claim 1, wherein the first LED and at least one of the one or more additional LEDs are configured to conduct current in opposing directions to form a bi-directional LED.

5. The decorative light string of claim 1, wherein the first LED and at least one of the one or more additional LEDs are configured to conduct current in a same direction to form a parallel LED.

6. The decorative light string of claim 1, further comprising:
- a plurality of second LED illumination assemblies electrically connected in series, wherein each of the plurality of second LED illumination assemblies includes a second LED;
- wherein the plurality of second LED illumination assemblies are connected in series with the stabilizing current or voltage circuit and are connected in parallel with the plurality of LED illumination assemblies, and
- wherein the stabilizing current or voltage circuit is configured to supply a stabilized current or voltage to the plurality of second LED illumination assemblies that provides a stable supply even with input power source fluctuations.

7. The decorative light string of claim 1, wherein the stabilizing current or voltage circuit is a constant current circuit configured to supply a stabilized current to the plurality of LED illumination assemblies even with input power source fluctuations.

8. The decorative light string of claim 1, wherein the first LED and at least one of the one or more additional LEDs are configured to conduct current in opposing directions.

9. The decorative light string of claim 1, wherein the first LED and at least one of the one or more additional LEDs are configured to conduct current in a same direction.

10. The decorative light string of claim 1, wherein the first LED and at least one of the one or more additional LEDs are each housed in a separate enclosure.

11. A method for preventing dimming of a light string constructed of plurality of light emitting diode (LED) illumination assemblies, which are protected against open circuiting due to LED failure, wherein each of the plurality of LED illumination assemblies includes a first LED and one or more additional LEDs electrically connected in parallel with the first LED, the method comprising:
- configuring the decorative light string to receive input power from an input power source;
- connecting a bypass element in parallel with the first LED and the one or more additional LEDs, so that in the event one of the first LED and the one or more additional LEDs fails, the light string will continue to conduct current;
- a controller controlling current flow provided to a stabilizing current or voltage circuit to switch between a steady on state to one or more special effects states; and
- the stabilizing current or voltage circuit that is electrically connected in series with the plurality of LED illumination assemblies supplying a stabilized current or voltage to the plurality of LED illumination assemblies even with input power source fluctuations, wherein supplying the stabilized current or voltage to the plurality of LED illumination assemblies includes:
  - a distribution circuit of the stabilizing current or voltage circuit outputting a stabilized DC current signal,
  - a current control circuit of the stabilizing current or voltage circuit that is electrically connected to the distribution circuit controlling a current of the stabilized DC current signal outputted by the distribution circuit, and
  - a resistive element electrically connected to the current control circuit having a resistance value for controlling the stabilized DC current.

12. A method for preventing shortening a life of a decorative light string constructed of a plurality of light emitting diode (LED) illumination assemblies, which are protected against open circuiting due to LED failure, wherein each of the plurality of LED illumination assemblies includes a first LED and one or more additional LEDs electrically connected in parallel with the first LED, the method comprising:
- configuring the decorative light string to receive input power from an input power source;
- connecting a bypass element in parallel with the first LED and the one or more additional LEDs, so that in the event one of the first LED and the one or more additional LEDs fails, the decorative light string will continue to conduct current;
- a controller controlling current flow provided to a stabilizing current or voltage circuit to switch between a steady on state to one or more special effects states; and
- the stabilizing current or voltage circuit that is electrically connected in series with the plurality of LED illumination assemblies supplying a stabilized current or voltage to the plurality of LED illumination assemblies even with input power source fluctuations, wherein supplying the stabilized current or voltage to the plurality of LED illumination assemblies includes:
  - a distribution circuit of the stabilizing current or voltage circuit outputting a stabilized DC current signal,
  - a current control circuit of the stabilizing current or voltage circuit that is electrically connected to the distribution circuit controlling a current of the stabilized DC current signal outputted by the distribution circuit, and
  - a resistive element electrically connected to the current control circuit having a resistance value for controlling the stabilized DC current.

13. The decorative light string of claim 1, wherein the current control circuit is electrically connected to a resistive element, and wherein the stabilized DC current is controlled by a resistance value of the resistive element.

14. The decorative light string of claim 1, wherein the distribution circuit prevents overheating of one or more of the LED illumination assemblies by preventing current to the plurality of LED illumination assemblies from exceeding a maximum current rating.

15. The decorative light string of claim 1, wherein when a current flowing through the stabilizing current or voltage circuit is greater than a maximum current threshold, the stabilizing current or voltage circuit is configured to use a feedback control loop to reduce the stabilized DC current signal outputted by the stabilizing current or voltage circuit.

16. The decorative light string of claim 1, wherein the controller is configured to control which of the first LED and any of the one or more additional LEDs are turned on or off at any given time.

17. The decorative light string of claim 1, wherein the controller includes a rectifier to convert the input power from the input power source from an alternating current (AC) input power to a direct current (DC) power.

18. The decorative light string of claim 1, wherein the stabilizing current or voltage circuit is provided in a printed circuit board that is housed within a protective housing.

* * * * *